F. B. MOORE.
COTTON CHOPPER.
APPLICATION FILED AUG. 30, 1916.

1,219,984.

Patented Mar. 20, 1917.
2 SHEETS—SHEET 1.

Witnesses
Hugh H. Ott
L. Wilcox

Inventor
F. B. Moore.
By Victor J. Evans
Attorney

F. B. MOORE.
COTTON CHOPPER.
APPLICATION FILED AUG. 30, 1916.
1,219,984.
Patented Mar. 20, 1917.
2 SHEETS—SHEET 2.
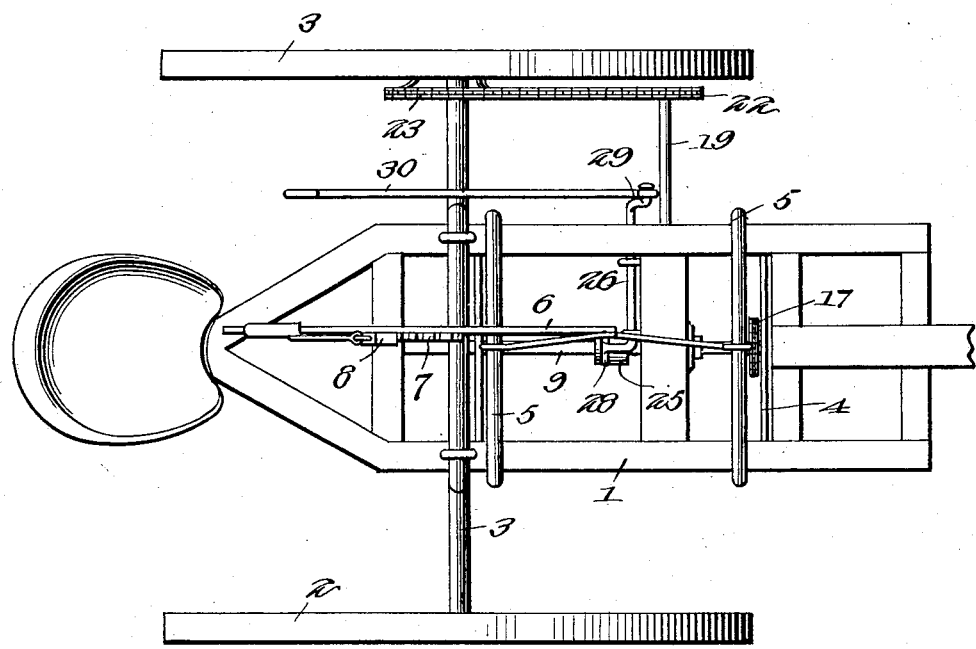
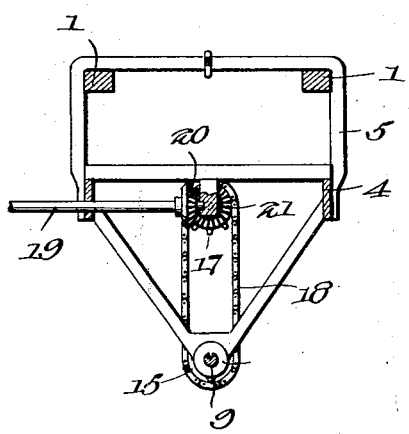
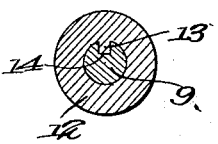
Witnesses
Hugh H. Ott
L. Wilcox
Inventor
F. B. Moore,
By Victor J. Evans
Attorney

UNITED STATES PATENT OFFICE.

FRED B. MOORE, OF COURTNEY, OKLAHOMA.

COTTON-CHOPPER.

1,219,984.   Specification of Letters Patent.   Patented Mar. 20, 1917.

Application filed August 30, 1916. Serial No. 117,755.

*To all whom it may concern:*

Be it known that I, FRED B. MOORE, a citizen of the United States, residing at Courtney, in the county of Jefferson and State of Oklahoma, have invented new and useful Improvements in Cotton-Choppers, of which the following is a specification.

This invention relates to cotton choppers and it consists in the novel features hereinafter described and claimed.

An object of the invention is to provide a cotton chopper in the form of an attachment adapted to be applied to the frame of a cultivator and having means for transmitting movement from one of the wheels of the cultivator to the chopping hoes in order that the same may move transversely of the row of plants during the chopping operation and cut out the superfluous plants.

A further object of the invention is to provide means for advancing or retarding the forward movement of the hoes with relation to the forward movement of the cultivator frame in order that the device may be manipulated to chop out the undesirable plants and permit the desirable plants to remain standing in the row.

With this object in view the device includes a frame adapted to be applied to the frame of a cultivator and a shaft slidably mounted thereon. The hoes are carried by the shaft and means are provided for operating or turning the shaft from one of the supporting wheels of the cultivator frame. Also means is provided for shifting the said shaft longitudinally whereby the hoes carried by the same may cut out the undesirable plants in a row as the machine progresses along the same.

In the accompanying drawings:—

Fig. 2 is a top plan view of the same;

Fig. 4 is a similar transverse sectional view of the same;

Fig. 5 is a transverse sectional view of a shaft used upon the chopper attachment.

Figure 1:
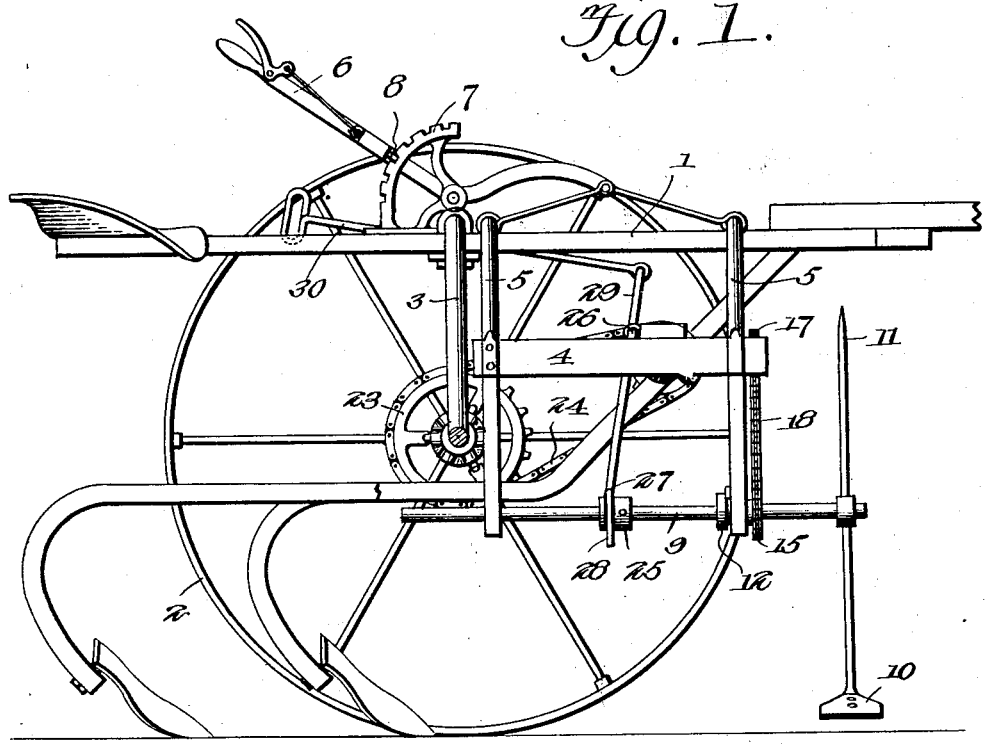
Figure 1 is a side view of a cultivator frame with the chopper attachment applied.
Figure 3:
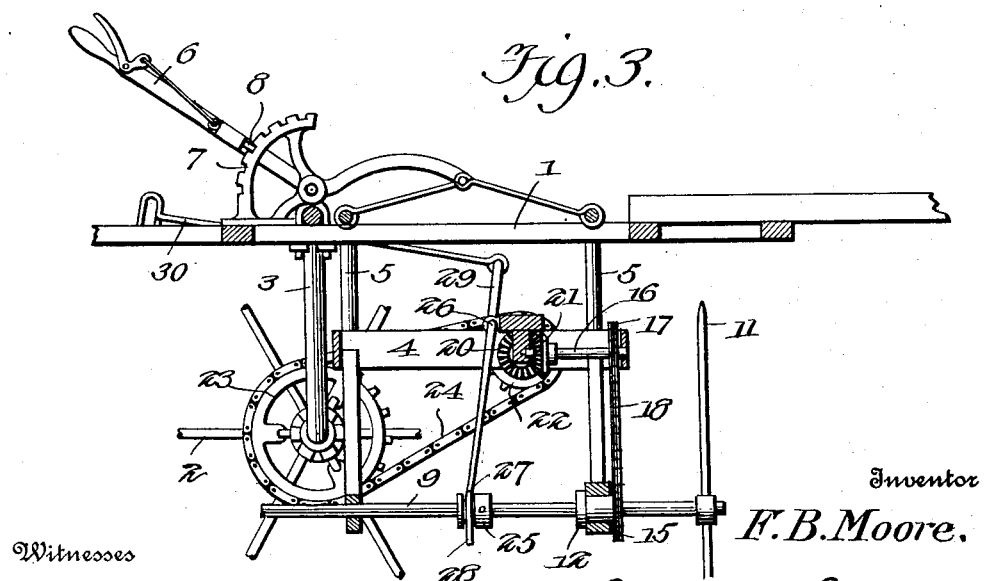
Fig. 3 is a fragmentary longitudinal sectional view of the same.

As illustrated in the accompanying drawing the frame 1 is such as is usually employed on the ordinary sulky cultivator and the said frame is supported by ground wheels 2 journaled on the arch axle 3 thereof.

The chopper attachment comprises a frame 4 which carries loops 5 which receive the forward portions of the side bars of the frame 1. A lever 6 is fulcrumed upon the frame 1 and one end of the said lever is connected with the loops 5. A dentate segment 7 is mounted upon the frame 1 and the lever 6 carries a spring pressed pawl 8 adapted to engage the teeth of the segment 7 whereby the lever is held at an adjusted position. It is apparent that by swinging the lever 6 the frame 4 may be raised or lowered and secured at an adjusted position by permitting the pawl 8 to engage the teeth of the segment 7. A shaft 9 is journaled in the lower portion of the frame 1 and is disposed under the forward intermediate portion of the frame 1. A hoe 10 is carried at the forward end of the shaft 9 and a chopping finger 11 is also carried at the forward end of the said shaft. A collar 12 is journaled in the lower portion of the frame 4 and slidably receives the shaft 9. The said collar 12 is provided with a tongue 13 which is slidably received in a groove 14. The said groove 14 is provided in the shaft 9 and extends longitudinally thereof. A sprocket wheel 15 is formed upon or provided upon the collar 12. The said collar 12 is restrained against longitudinal movement in the frame 4 although the said collar is free to rotate therein. A stub shaft 16 is journaled in the intermediate portion of the frame 4 and carries at its forward end a sprocket wheel 17. A sprocket chain 18 is trained around the sprocket wheels 15 and 17 and is adapted to transmit rotary movement from the shaft 16 to the shaft 9. A stud shaft 19 is journaled at the upper intermediate portion of the frame 4 and is transversely disposed with relation to the shaft 16. The shaft 19 carries at its inner end a beveled pinion 20 which meshes with a similar pinion 21 carried at the rear end of the shaft 16. A sprocket wheel 22 is fixed to the outer end of the shaft 19 and a sprocket wheel 23 is fixed to the hub of one of the supporting wheels 2. A sprocket chain 24 is trained around the sprocket wheels 22 and 23 and is adapted to transmit rotary movement from one of the supporting wheels 2 to the shaft 19. Through the intermeshing pinions 21 rotary movement is transmitted from the shaft 19 to the shaft 16. Therefore it will be seen that as the frame 1 is moved along the ground the shaft 9 is rotated from one of the supporting wheels 2 and the hoe 10 and finger 11 are moved transversely of the row of plants and they cut out the undesired plants in the row.

A grooved collar 25 is fixed to the intermediate portion of the shaft 9 and a shaft 26 is journaled upon the frame 1 and is provided with a laterally disposed end portion 27 having a fork 28 which lies in the groove of the collar 25.

Means hereinafter described are provided for turning the shaft 26 and it will be seen that as the said shaft is turned the end portion 27 thereof is swung whereby the fork 28 moves the collar 25 and shaft 9 longitudinally. Therefore it is possible to advance or retard the forward movement of the hoe 10 and finger 11 with relation to the forward movement of the frame 1 in order that the said hoe and finger may chop the particular undesired plants out of the row of standing plants. During the cutting operation the finger 11 makes a transverse incision in the soil at the row of plants and the hoe 10 following immediately after the said finger chops out the plants which are adjacent the incision made by the said finger and thus the plants are removed from the row with a clean cut and those plants left standing in the row have sufficient soil remaining about the roots thereof and the soil is not left in a ragged or irregular condition.

The shaft 26 hereinbefore described is provided with an end portion 29 which is disposed approximately parallel with the intermediate portion of the shaft 26 and above the same. A rod 30 is pivotally connected at its forward end with the end portion 29 of the shaft 26 and the said rod extends back over the intermediate portion of the arch axle 3 and may be used by the operator who is mounted upon the frame 1 for turning the shaft 26.

From the foregoing description taken in conjunction with the accompanying drawing it will be seen that a cotton chopper attachment of simple and durable form is provided and that the parts thereof may be easily and quickly manipulated to cause the hoe and chopping finger to move the undesired plants from the row of plants and the said chopping elements may be advanced or retarded to permit the desired plants to remain in the row in condition to facilitate the advantageous maturing or developing of the said standing plants.

Having described the invention what is claimed is:—

In combination with a wheel mounted frame, a cotton chopper attachment comprising loops movably mounted on the frame, a lever fulcrumed on the frame and operatively connected with the loops, a supplemental frame carried by the loops, a journaled shaft slidably mounted on the supplemental frame, a chopper carried by the said shaft, a crank shaft pivoted on the supplemental frame and having one end operatively connected with the first mentioned shaft to slide the same, a rod pivotally connected with the other end of the crank shaft, a motion transmission mechanism mounted on the supplemental frame and operatively connected with the first mentioned shaft, to rotate the same, and means for operating said transmission mechanism from one of the supporting wheels of the first mentioned frame.

In testimony whereof I affix my signature.

FRED B. MOORE.

Copies of this patent may be obtained for five cents each, by addressing the "Commissioner of Patents, Washington, D. C."